United States Patent
Chang et al.

(10) Patent No.: US 8,120,695 B2
(45) Date of Patent: Feb. 21, 2012

(54) CAMERA MODULE HAVING A LENS BARREL HOLDER INCLUDING A PROTRUSION INSERTED IN A RECESS IN A SIDEWALL OF THE LENS BARREL AND PROVIDING GOOD COAXIALITY

(75) Inventors: Chia-Chun Chang, Taipei Hsien (TW); Hou-Yao Lin, Taipei Hsien (TW); Chai-Wei Lee, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 140 days.

(21) Appl. No.: 12/644,598

(22) Filed: Dec. 22, 2009

(65) Prior Publication Data

US 2011/0001862 A1    Jan. 6, 2011

(30) Foreign Application Priority Data

Jul. 6, 2009   (CN) .......................... 2009 1 0304049

(51) Int. Cl.
*H04N 5/225* (2006.01)
*G03B 17/00* (2006.01)
*G02B 7/04* (2006.01)

(52) U.S. Cl. ......... 348/340; 348/374; 396/439; 396/144

(58) Field of Classification Search .................. None
See application file for complete search history.

(56) References Cited

U.S. PATENT DOCUMENTS

| 7,405,764 | B2* | 7/2008 | Gustavsson et al. | 348/374 |
| 7,555,211 | B2* | 6/2009 | Go | 396/268 |
| 7,920,206 | B2* | 4/2011 | Moon et al. | 348/374 |
| 2005/0018068 | A1* | 1/2005 | Tsai et al. | 348/335 |
| 2006/0044455 | A1* | 3/2006 | Kim et al. | 348/360 |

* cited by examiner

*Primary Examiner* — Luong T Nguyen
(74) *Attorney, Agent, or Firm* — Altis Law Group, Inc.

(57) ABSTRACT

A camera module includes a lens barrel assembly and a lens holder. The lens assembly includes a lens barrel and a lens received in the lens barrel. The lens include an optical axis. The lens barrel defines a recess in a sidewall of the lens barrel. The barrel holder includes a peripheral sidewall, an inner flange formed on an inner surface of the peripheral sidewall, and a protrusion extending from the inner flange. The peripheral sidewall of the barrel holder is threadedly engaged with the lens barrel. The protrusion extends in a direction parallel to the optical axis and is inserted in the recess.

10 Claims, 2 Drawing Sheets

CAMERA MODULE HAVING A LENS BARREL HOLDER INCLUDING A PROTRUSION INSERTED IN A RECESS IN A SIDEWALL OF THE LENS BARREL AND PROVIDING GOOD COAXIALITY

BACKGROUND

1. Technical Field

The present disclosure relates to camera modules, more particularly, to a camera module with good coaxiality.

2. Description of Related Art

Current camera modules generally include a first lens assembly (such as a lens barrel and a lens holder), and a second lens assembly (such as a lens holder and a lens barrel). The first lens assembly is threadedly engaged with the second lens assembly.

However, if thread on the first lens assembly or on the second lens assembly is substandard, the lens assemblies will have a loose fit to allow the first lens assembly to shake perpendicular to the optical axis direction of the second lens assembly during focusing. Thus, the coaxiality of the camera module is inferior.

Therefore, what is needed is to provide a camera module with good coaxiality.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
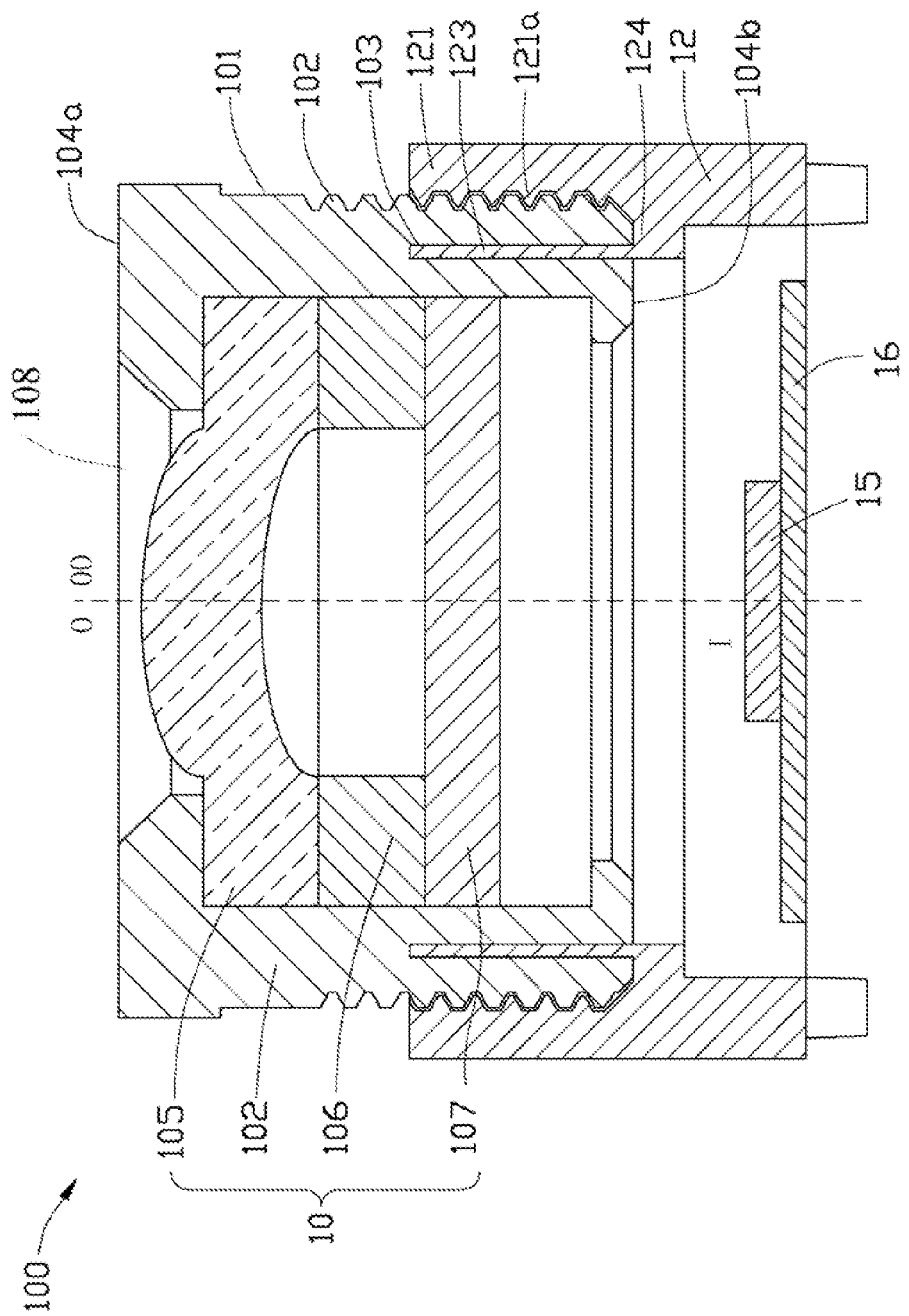
FIG. 1 is a schematic, cross-sectional view of a camera module, in accordance with an exemplary embodiment.

Referring to FIG. 1, a camera module 100 in accordance with an exemplary embodiment is illustrated. The camera module 100 includes a first lens assembly 10, a second lens assembly 12 threadedly engaged with the first lens assembly 10, an image sensor 15, and a circuit board 16. In this embodiment, the first lens assembly 10 is a lens barrel assembly, and the second lens assembly 12 is a lens holder.

The circuit board 16 can be a printed circuit board. The image sensor 15 is mounted on the circuit board 16 and is electrically coupled to the circuit board 16. The image sensor 15 can be a charge-coupled device (CCD) sensor or a complementary metal oxide semiconductor (CMOS) sensor.

The lens barrel assembly 10 includes a lens barrel 102, a lens 105 including an optical axis OO', a spacer ring 106, and a filter 107. The lens barrel 102 is configured for receiving the lens 105, the spacer ring 106, and the filter 107 in an order from an object side O to an image side I. The lens 105 is configured for converging light reflected/emitted from an object to the image sensor 15. The image sensor 15 converts the received light to electrical signal, thereby an image is formed/constructed by the image sensor 15. The spacer ring 106 keeps the lens 105 from contacting the filter 107 to prevent damage. The filter 107 covers the image sensor 15, and filters out infrared rays from the light to the image sensor 15.

The lens barrel 102 includes an externally threaded first sidewall 101. The first sidewall 101 includes two opposite end surfaces 104a, 104b. A through hole 108 is defined on the end surface 104a and configured for allowing light to travel through the lens 105, the spacer ring 106, and the filter 107 to the image sensor 15. A ring-shaped recess 103 is defined in the first sidewall 101 of the lens barrel 102. In this embodiment, the recess 103 is defined in the end surface 104b, and the recess 103 is cylindrical and coaxially aligned with the optical axis OO'.

The lens holder 12 includes an internally threaded peripheral second sidewall 121, a protrusion 123, and an inner flange 124. The second sidewall 121 includes an inner surface 121a. The inner flange 124 is formed on the inner surface 121a of the second sidewall 121. The protrusion 123 extends from the inner flange 124. In this embodiment, the inner flange 124 extends from the middle of the inner surface 121a, and the protrusion 123 is a hollow cylinder. The second sidewall 121 of the holder 12 is threadedly engaged with the first sidewall 101 of the lens barrel 102. The protrusion 123 extends in a direction parallel to the optical axis OO' and is inserted in the recess 103. Note that the threads are configured for loose engagement to allow for easy adjustment/rotation during focusing. In this embodiment, the length of the protrusion 123 is equal to that of the recess 103. In other embodiment, the protrusion 123 and the inner flange 124 can be integrated as a guiding member, and the guiding member comprises a cylindrical portion extending parallel to the axis direction of the second lens assembly 12.

When the camera module 100 is focusing, the lens barrel 102 rotates relative to the lens holder 12. During this process, the protrusion 123, received in the recess 103, guides the lens barrel 102 to move along the optical axis OO' direction, and inhibits movement of the lens barrel 102 perpendicular to the optical axis OO' direction, so that the camera module 100 has good coaxiality. Vibration or shaking of the lens barrel 102 relative to the lens holder 12 is limited, and the anti-shake function of the camera module 100 is advanced.

Figure 2:
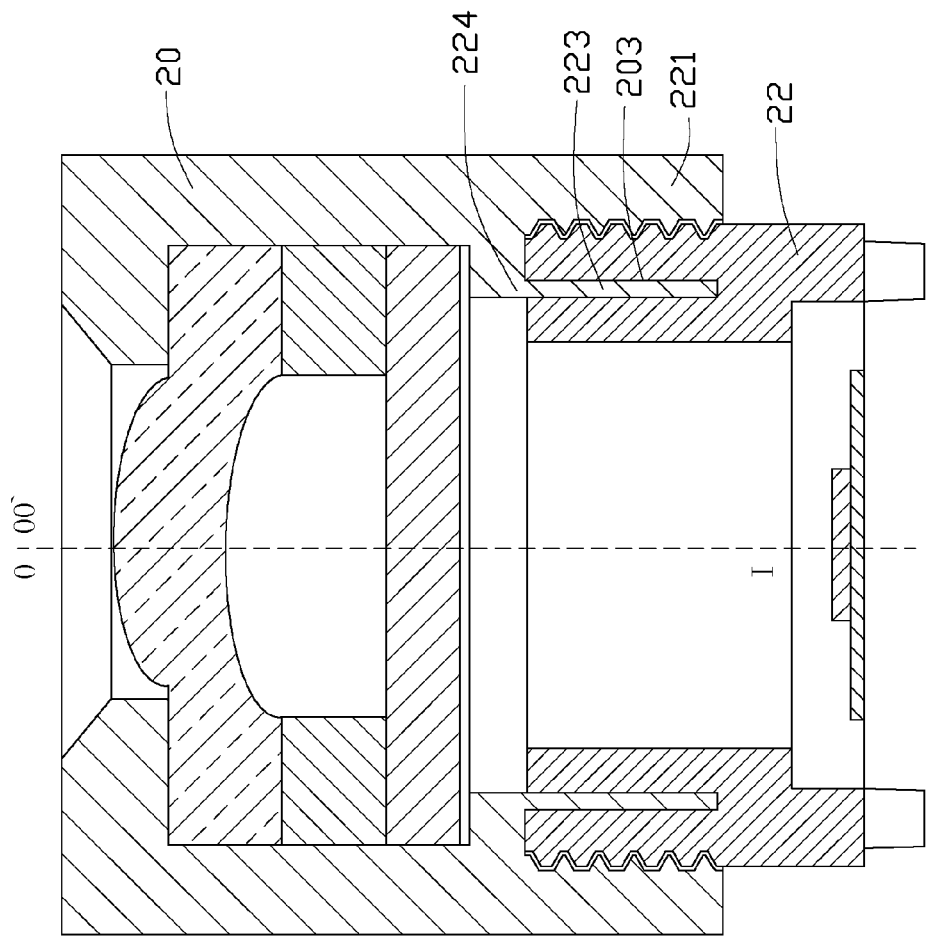
FIG. 2 is a schematic, cross-sectional view of a camera module, in accordance with another exemplary embodiment.

Referring to FIG. 2, a camera module 200 according to another exemplary embodiment, includes a first lens assembly 20 and a second lens assembly 22. The camera module 200 is similar to the camera module 100 except that a protrusion 223 and a inner flange 224 are arranged on the first lens assembly 20, and a recess 203 is defined in a second sidewall 221 of the second lens assembly 22.

Advantages of the camera module 200 of the exemplary embodiment are similar to those of the camera module 100.

It is to be understood, however, that even though numerous has been described with reference to particular embodiments, but the present disclosure is not limited to the particular embodiments described and exemplified, and the embodiments are capable of considerable variation and modification without departure from the scope of the appended claims.

What is claimed is:

1. A camera module, comprising:
    a lens barrel assembly comprising a lens barrel and a lens, the lens barrel comprising a first sidewall, the lens having an optical axis, the lens barrel defining a through hole bounded by the first sidewall and a ring-shaped recess in the image-side end of the first sidewall, the lens being received in the through hole, the ring-shape recess being symmetrical about the optical axis and surrounding the through hole;
    a barrel holder comprising a peripheral second sidewall, an inner flange formed on an inner surface of the second sidewall, and a protrusion extending from the inner flange, the second sidewall being threadedly engaged with the first sidewall, the protrusion extending in a direction parallel to the optical axis inserting into the recess, and guiding the lens barrel to move along the optical axis.

2. The camera module of claim 1, wherein the protrusion is a hollow cylinder slidably engaged in the recess.

3. The camera module of claim 2, wherein the inner flange extends from the second sidewall along a direction perpendicular to the optical axis.

4. The camera module of claim 1, wherein the lens barrel is threadedly engaged with the barrel holder in a loose fit manner.

5. The camera module of claim 3, further comprising a circuit board and an image sensor electrically mounted on the circuit board, wherein the circuit board and the image sensor are received in the barrel holder in an order from the image side to the object side.

6. The camera module of claim 5, wherein the circuit board is a printed circuit board.

7. The camera module of claim 5, wherein the image sensor is selected from the group consisting of a charge-coupled sensor and a complementary metal oxide semiconductor sensor.

8. The camera module of claim 1, wherein the lens barrel assembly comprises a spacer ring and a filter, all of the lens, the spacer ring and the filter are arranged in an order from the object side to the image side.

9. The camera module of claim 1, wherein the length of the protrusion along the direction parallel to the optical axis is substantially equal to that of the recess.

10. The camera module of claim 1, wherein the ring-shaped recess is separated from the through hole.

* * * * *